F. L. PAIGE.
PLOW OR DISK HARROW.
APPLICATION FILED JAN. 9, 1920.

1,419,585.

Patented June 13, 1922.

WITNESSES:

INVENTOR
Frank Louis Paige.
BY
ATTORNEY

UNITED STATES PATENT OFFICE.

FRANK LOUIS PAIGE, OF BRAWLEY, CALIFORNIA.

PLOW OR DISK HARROW.

1,419,585. Specification of Letters Patent. Patented June 13, 1922.

Application filed January 9, 1920. Serial No. 350,475.

*To all whom it may concern:*

Be it known that I, FRANK LOUIS PAIGE, a citizen of the United States of America, residing at Brawley, Imperial County, State of California, have invented certain new and useful improvements in Plows or Disk Harrows, of which the following is a clear and exact description enabling those skilled in the art to which it appertains to make and use the same.

An object of this invention is the provision with a disk machine as hereinafter shown in modified form, of suitable bearings on which such disks revolve, means of conveying a lubricant to such bearings, and support means, such as an extending arm so designed and shaped as to allow each disk attached thereto to assume a predetermined angle adapted to cut the earth and throw the cut possibly to the right, and a second set of disks substantially attached to further extensions of the same arms and set at substantially reverse angles to the first set of disks, and adapted to turn the earth in a reverse direction to the first set, namely in this case to the left.

A further object of this invention is the provision in a machine of the character specified, a plurality of disks set at an angle and suitably spaced, of a second set of disks of approximately the same number set at a negative angle and so adjusted as to divide the distance between the first set of disks, substantially for the purpose as set forth.

A still further object is the provision in a plow or disk harrow machine of a plurality of disks suitably spaced and assuming a definite angle, thereby adapted to effect a cut through the earth of approximately one-half the width of the spacing of such disks and a second set of disks of substantially the same number as the first set spaced approximately the same, effecting a cut of approximately the same width but so positioned as to cut through that portion of the earth left undisturbed by the action of such first named disks.

It will be obvious from the foregoing that if the first series of disks are spaced say 8 inches apart, and so set as to effect a cut of half their spacing or namely 4 inches at the average depth of operation, then an undisturbed portion of ground will be allowed to pass through these disks of approximately the same width as that portion cut, and turned over. It is the object of the second series of disks to remove these portions of ground left undisturbed by the first set and it is calculated that after this instrument has been so drawn through the ground by any suitable means that it will effectively loosen up the soil and accomplish results unattainable by other means.

Figure 1:
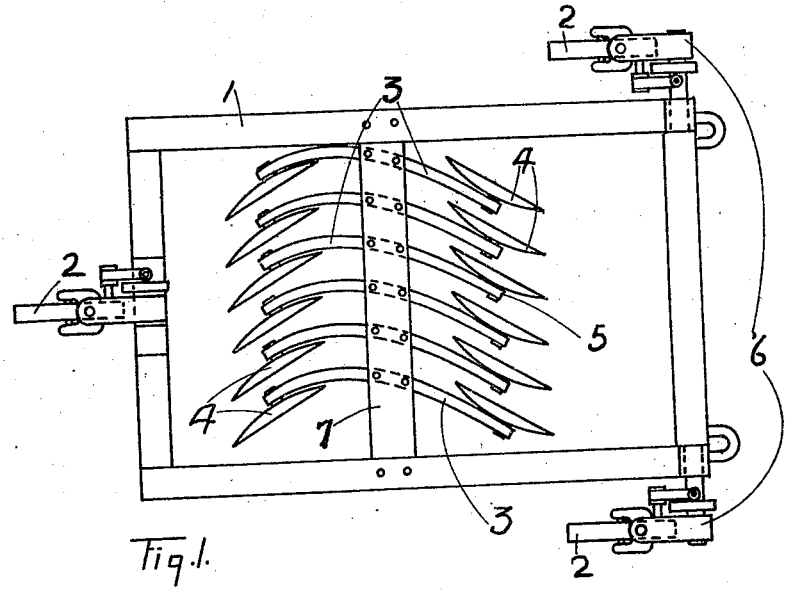
Figure 2:
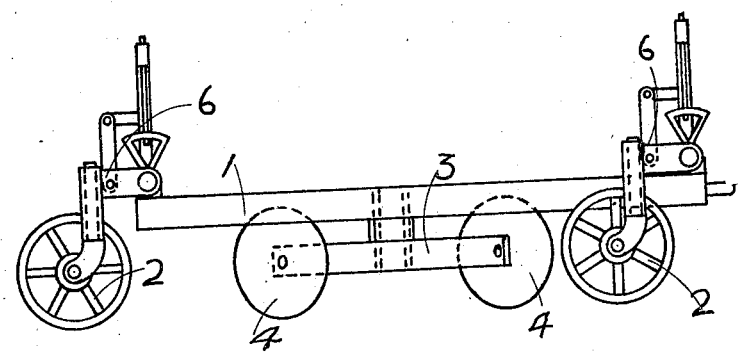

Reference being had to the accompanying drawings which form part of this specification, Fig. 1 represents a diagrammatic and plan view of my invention, looking down on the device and showing the relative position of the disks and the arms for holding such disks respectively, substantially as indicated; and Fig. 2 represents a side elevation of my invention showing in modified form the possible application of wheels and means for raising or lowering the frame 1 a pre-determined height from the ground. 1 is a suitable frame for indirectly holding or supporting the disks by means of a cross member and the attendant and supporting arms represented by 3 of the accompanying drawings. 2 represents suitable wheels which are adapted to support the machine and prevent the disks from entering the ground below a predetermined depth. The cross arms, 3, are rigidly attached at points centrally of their ends to a central transverse frame member, 7, and are provided with disks, 4, suitably fulcrumed at their extreme ends. 5 represents the bearings or points at which said disks are fulcrumed, and may be designed in a manner suited to the purpose. 6 represents a suitable mechanism possibly along conventional lines, for raising or lowering the frame, 1, relative to the ground.

In the operation of my invention, a suitable propulsion means may be employed for pulling or otherwise propelling my invention. The means, 6, which may be of standard known design in the art, may be operative to raise or lower the frame, 1, relative to the ground in a manner so that the disks 4 will cut into the ground to a pre-determined depth and being rigidly attached to connecting arms 3, and they being rigidly attached to frame 1, by means of cross member 7; all of the disks 4 will cut to a similar depth, and as herein-before set forth, one set of disks shall be so arranged as to operate on earth or soil which has been undisturbed by a preceding row of disks, substantially as here-in-before set forth.

I claim:

1. In a plow or disk harrow, a frame, a central transverse member carried by the frame, a series of arms each secured centrally of the ends thereof to the member, and disks on each of the free ends of the respective arms.

2. In a plow or disk harrow, a frame, a central transverse member carried by the frame, a series of curved arms each secured centrally of the ends thereof to the member, and a pair of disks secured to each arm at the ends thereof and arranged reversely to each other.

3. In a plow or disk harrow, a frame, a central transverse member carried by the frame, a series of arms each secured centrally of the ends thereof to the member, and disks on each of the free ends of the respective arms arranged with a disk on one side of the free end of each arm, and a similar disk on the opposite side of the free end of each arm.

4. In a plow or disk harrow, a frame, a central transverse support carried by the frame, a series of disks on each side of the support, and a series of elements each connected at its center to the support and each having one disk of each series secured thereto.

5. In a plow or disk harrow, a frame, a central transverse support carried thereby, a series of arms each secured centrally of its length to the support, and a disk on the free end of each end of each arm, and raising and lowering means for each end of the frame.

FRANK LOUIS PAIGE.